United States Patent
Planque et al.

(10) Patent No.: US 9,917,311 B2
(45) Date of Patent: Mar. 13, 2018

(54) ELECTRICAL INSULATION AND SEALING SURROUND FOR WATER ELECTROLYSIS REACTOR (SOEC) OR FUEL CELL (SOFC)

(71) Applicant: COMMISSARIAT À L'ENERGIE ATOMIQUE ET AUX ENERGIES ALTERNATIVES, Paris (FR)

(72) Inventors: Michel Planque, Seyssins (FR); Stéphane Di Iorio, Lans-en-Vercors (FR); Magali Reytier, Villard de Lans (FR); Philippe Szynal, Aix-les-Bains (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 293 days.

(21) Appl. No.: 14/654,744

(22) PCT Filed: Dec. 18, 2013

(86) PCT No.: PCT/IB2013/061109
§ 371 (c)(1),
(2) Date: Jun. 22, 2015

(87) PCT Pub. No.: WO2014/097191
PCT Pub. Date: Jun. 26, 2014

(65) Prior Publication Data
US 2015/0333342 A1 Nov. 19, 2015

(30) Foreign Application Priority Data
Dec. 21, 2012 (FR) .................... 12 62611

(51) Int. Cl.
*H01M 2/38* (2006.01)
*H01M 8/0271* (2016.01)
(Continued)

(52) U.S. Cl.
CPC ............. *H01M 8/0271* (2013.01); *C25B 1/10* (2013.01); *C25B 1/12* (2013.01); *C25B 9/08* (2013.01);
(Continued)

(58) Field of Classification Search
CPC .. H01M 8/0271; H01M 8/0258; H01M 8/026; H01M 8/2425; H01M 8/0282;
(Continued)

(56) References Cited

U.S. PATENT DOCUMENTS

2002/0106548 A1  8/2002  Chung et al.
2004/0048140 A1  3/2004  King
(Continued)

FOREIGN PATENT DOCUMENTS

WO  2011/148769 A1  12/2011

OTHER PUBLICATIONS

Mar. 21, 2014 International Search Report issued in International Patent Application No. PCT/IB2013/061109.

*Primary Examiner* — Jane Rhee
(74) *Attorney, Agent, or Firm* — Oliff PLC

(57) ABSTRACT

The invention relates essentially to an electrical insulation and sealing surround for distributing gases in a high temperature steam electrolyzer of SOEC type or in a fuel cell of SOFC type. According to the invention, some of the functions of sealing, distributing gases and providing electrical insulation between interconnectors are grouped together within one and same component in the form of a surround made of electrically insulating material, the recessed zones of which serve to support the actual sealing gaskets, making them easier to use and to maintain.

14 Claims, 5 Drawing Sheets

Figure 1:
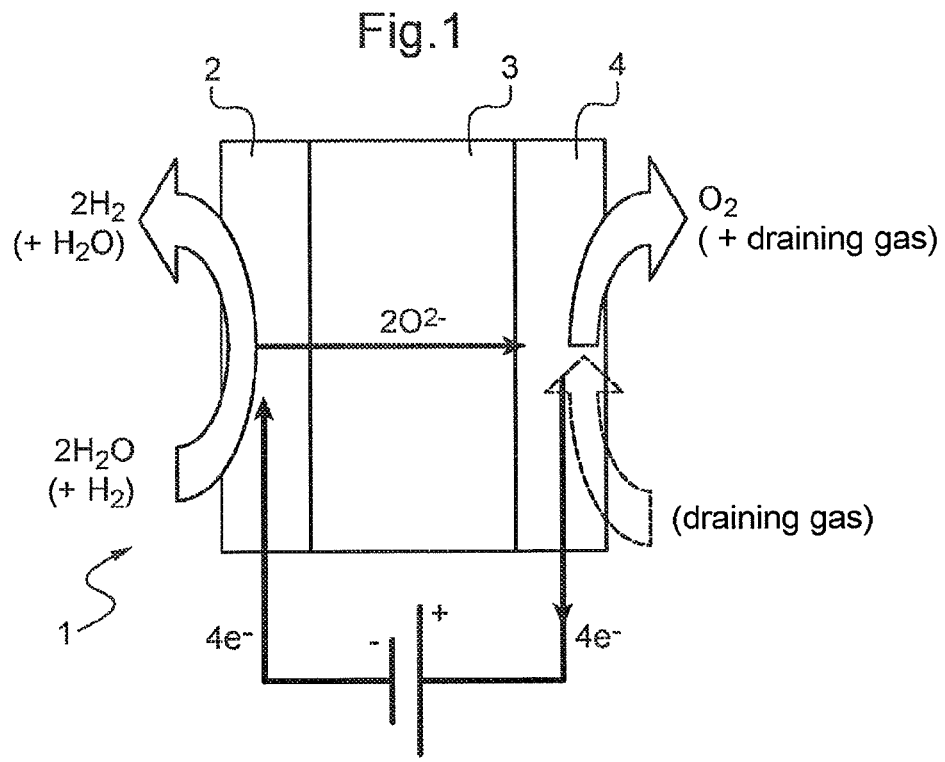

(51) Int. Cl.
*H01M 8/0258* (2016.01)
*C25B 9/08* (2006.01)
*C25B 1/10* (2006.01)
*H01M 8/026* (2016.01)
*H01M 8/2425* (2016.01)
*H01M 8/0282* (2016.01)
*H01M 8/0273* (2016.01)
*C25B 1/12* (2006.01)
*C25B 9/20* (2006.01)
*H01M 8/124* (2016.01)

(52) U.S. Cl.
CPC ............... *C25B 9/20* (2013.01); *H01M 8/026* (2013.01); *H01M 8/0258* (2013.01); *H01M 8/0273* (2013.01); *H01M 8/0282* (2013.01); *H01M 8/2425* (2013.01); *H01M 2008/1293* (2013.01); *H01M 2300/0074* (2013.01); *Y02E 60/366* (2013.01)

(58) Field of Classification Search
CPC ....... H01M 8/0273; H01M 2300/0074; H01M 2008/1293
See application file for complete search history.

(56) References Cited

U.S. PATENT DOCUMENTS

| | | |
|---|---|---|
| 2004/0241544 A1 | 12/2004 | Nakaishi et al. |
| 2005/0186463 A1 | 8/2005 | Finkenwirth et al. |
| 2011/0269059 A1 | 11/2011 | Mukerjee |
| 2013/0130144 A1 | 5/2013 | Todo et al. |

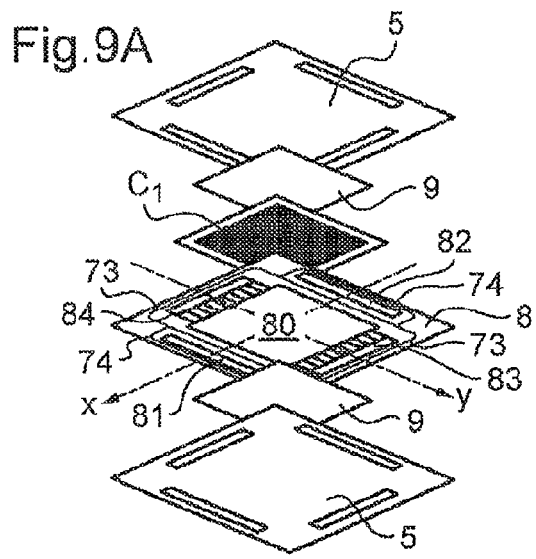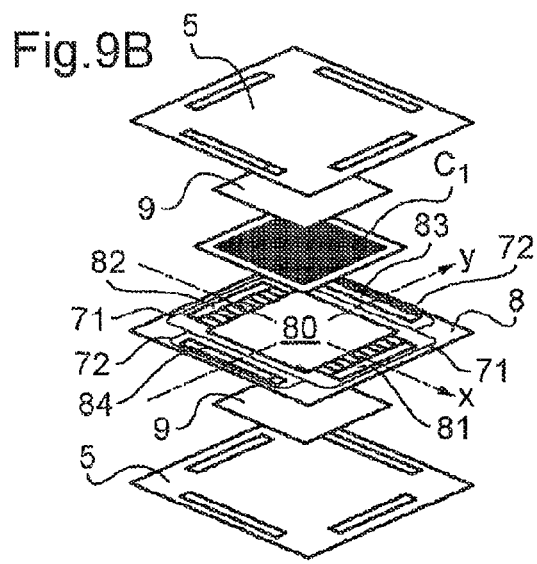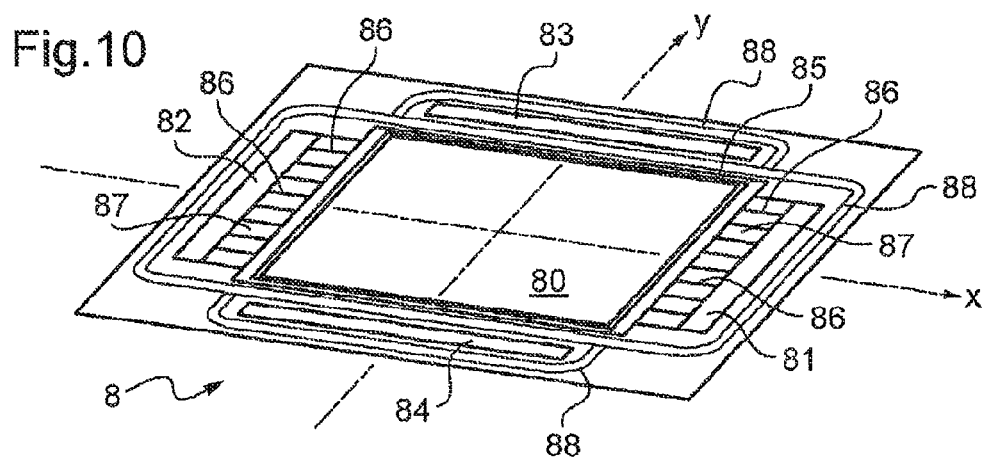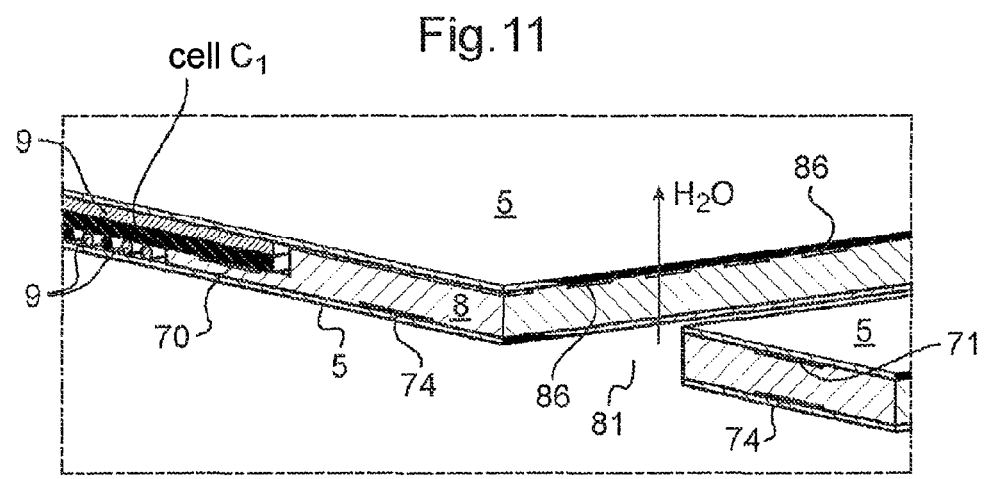

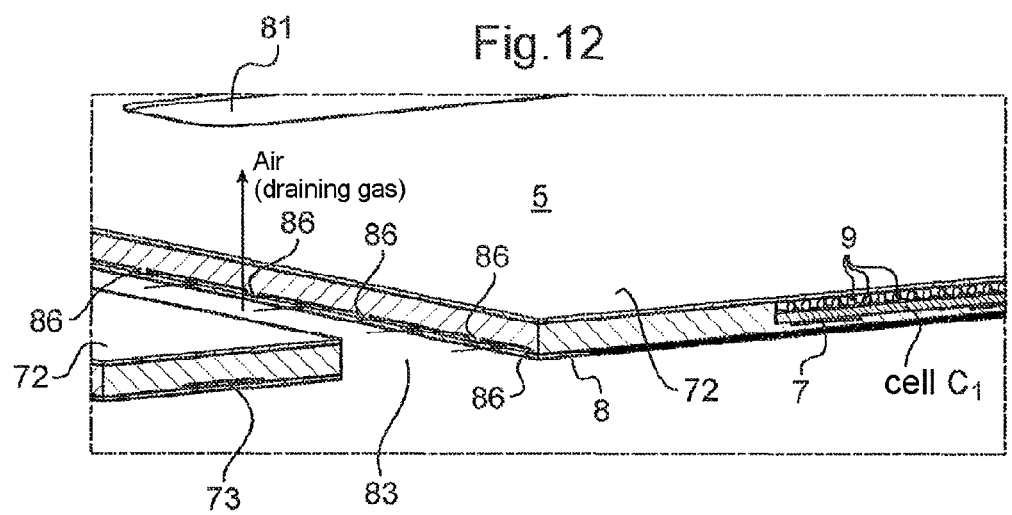
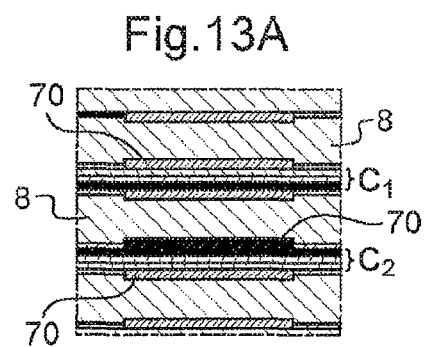
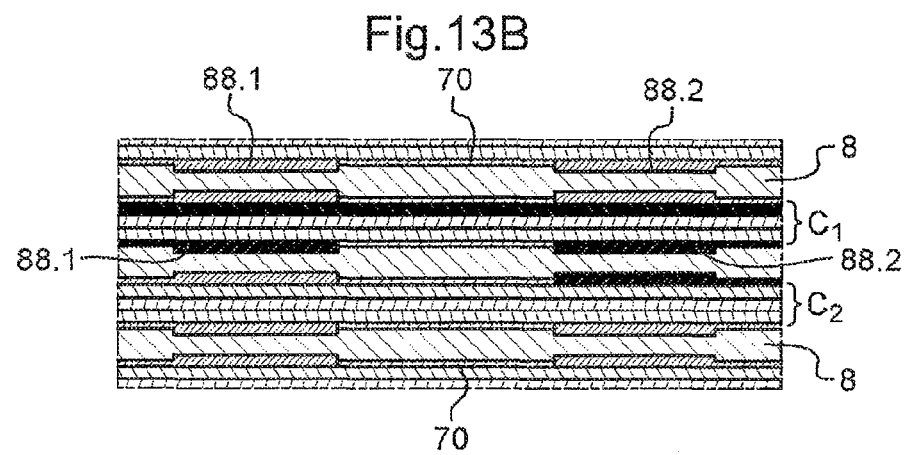
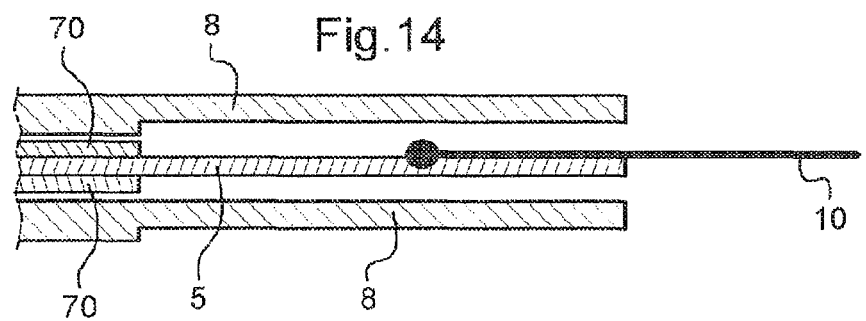

ELECTRICAL INSULATION AND SEALING SURROUND FOR WATER ELECTROLYSIS REACTOR (SOEC) OR FUEL CELL (SOFC)

TECHNICAL FIELD

The present invention relates to the field of solid oxide fuel cells (SOFCs) and that of high-temperature electrolysis of water (HTE, high-temperature electrolysis, or else HTSE, high-temperature steam electrolysis) also with solid oxides (SOEC, solid oxide electrolyte cell).

The invention relates more particularly to the production of a novel electrical insulation and sealing surround for distributing gases within a high-temperature water electrolysis (HTE) reactor of SOEC type for producing hydrogen $H_2$ from steam $H_2O$, or a fuel cell of SOFC type, having a stack of individual electrochemical cells.

Although described with reference mainly to the high-temperature water electrolysis application, the invention applies just as well to an SOFC fuel cell.

PRIOR ART

The electrolysis of water is an electrolytic reaction which breaks down water into gaseous dioxygen and dihydrogen with the aid of an electric current according to the reaction:

$$H_2O \rightarrow H_2 + \tfrac{1}{2}O_2.$$

In order to carry out the electrolysis of water, it is advantageous to carry it out at high temperature, typically between 600° C. and 950° C., since some of the energy needed for the reaction may be provided by heat, which is less expensive than electricity, and the activation of the reaction is more effective at high temperature and does not require a catalyst. To perform high temperature electrolysis, it is known to use an electrolyzer of SOEC (solid oxide electrolyte cell) type, consisting of a stack of individual units each comprising a solid oxide electrolytic cell, consisting of three anode/electrolyte/cathode layers superposed on one another, and of interconnection plates made of metal alloys also known as bipolar plates, or interconnectors. The role of the interconnectors is to ensure both the passage of the electric current and the circulation of the gases in the vicinity of each cell (steam injected, hydrogen and oxygen extracted in an HTE electrolyzer; air and hydrogen injected and water extracted in an SOFC cell) and to separate the anode and cathode compartments which are the compartments for circulation of the gases on the anode and cathode side, respectively, of the cells. In order to perform the HTE electrolysis of steam at high temperature, steam $H_2O$ is injected into the cathode compartment. Under the effect of the current applied to the cell, the dissociation of the water molecules in vapor form is carried out at the interface between the hydrogen electrode (cathode) and the electrolyte: this dissociation produces dihydrogen gas $H_2$ and oxygen ions. The dihydrogen is collected and discharged at the outlet of the hydrogen compartment. The oxygen ions $O^{2-}$ migrate through the electrolyte and recombine as dioxygen at the interface between the electrolyte and the oxygen electrode (anode).

As shown schematically in FIG. 1, each individual electrolytic cell 1 is formed from a cathode 2 and an anode 4, placed on either side of a solid electrolyte 3 generally in membrane form. The two electrodes (cathode and anode) 2, 4 are electron conductors, made of porous material, and the electrolyte 3 is gastight, and an electronic insulator and ionic conductor. The electrolyte may in particular be an anionic conductor, more specifically an anionic conductor of the $O^{2-}$ ions and the electrolyzer is then referred to as an anionic electrolyzer.

The electrochemical reactions take place at the interface between each of the electron conductors and the ionic conductor.

At the cathode 2, the half-reaction is the following:

$$2H_2O + 4e^- \rightarrow 2H_2 + 2O^{2-}.$$

At the anode 4, the half-reaction is the following:

$$2O^{2-} \rightarrow O_2 + 4e^-.$$

The electrolyte 3 inserted between the two electrodes 2, 4 is the site of migration of the $O^{2-}$ ions, under the effect of the electric field created by the potential difference imposed between the anode 4 and the cathode 2.

As illustrated between parentheses in FIG. 1, the steam at the inlet of the cathode may be accompanied by hydrogen $H_2$ and the hydrogen produced and recovered at the outlet may be accompanied by steam. Similarly, as illustrated by dotted lines, a draining gas, such as air, may also be injected at the inlet in order to discharge the oxygen produced. The injection of a draining gas has the additional role of acting as a thermal regulator.

An individual electrolysis reactor consists of an individual cell as described above, with a cathode 2, an electrolyte 3, and an anode 4 and of two monopolar connectors which carry out the electrical, hydraulic and thermal distribution functions.

In order to increase the flows of hydrogen and oxygen produced, it is known to stack several individual electrolytic cells on top of one another, separating them with interconnecting devices, usually referred to as bipolar interconnection plates or interconnectors. The assembly is positioned between two end interconnection plates which bear the power supplies and gas supplies of the electrolyzer (electrolysis reactor).

A high-temperature water electrolyzer (HTE) thus comprises at least one, generally a plurality of electrolytic cells stacked on one another, each individual cell being formed from an electrolyte, a cathode and an anode, the electrolyte being inserted between the anode and the cathode.

The fluidic and electrical interconnection devices that are in electrical contact with one or more electrodes in general carry out the roles of supplying and collecting electric current and delimit one or more compartments for circulation of the gases.

Thus, a cathode compartment has the role of distributing the electric current and the steam and of recovering hydrogen at the cathode in contact.

An anode compartment has the role of distributing electric current and also of recovering the oxygen produced at the anode in contact, optionally with the aid of a draining gas.

Figure 2:
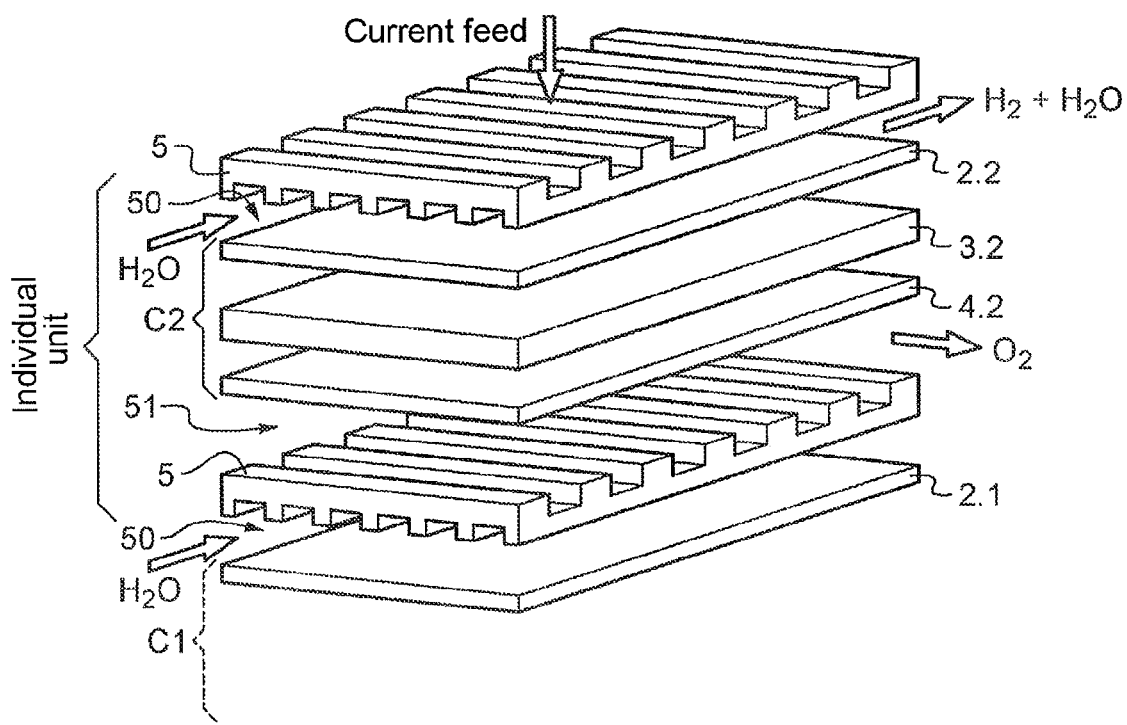

FIG. 2 represents an exploded view of individual units of a high-temperature steam electrolyzer according to the prior art. This HTE electrolyzer comprises a variety of individual electrolytic cells C1, C2 . . . of solid oxide (SOEC) type stacked alternately with interconnectors 5. Each cell C1, C2 . . . consists of a cathode 2.1, 2.2, . . . and of an anode 4.1, 4.2, positioned between which is an electrolyte 3.1, 3.2 . . . . The assembly of the electrolytic cells is supplied in series by the electric current and in parallel by the gases.

The interconnector 5 is a component made of metal alloy which ensures the separation between the cathode compartment 50 and anode compartment 51, defined by the volumes between the interconnector 5 and the adjacent cathode 2.1 and between the interconnector 5 and the adjacent anode 4.2 respectively. It also ensures the distribution of the gases to the cells. The injection of steam into each individual unit takes place in the cathode compartment 50. The hydrogen produced and the residual steam at the cathode 2.1, 2.2 . . . are collected in the cathode compartment 50 downstream of the cell C1, C2 . . . after dissociation of the steam. The oxygen produced at the anode 4.2 is collected in the anode compartment 51 downstream of the cell C1, C2 . . . .

The interconnector 5 ensures the passage of the current between the cells C1 and C2 by direct contact with the adjacent electrodes, that is to say between the anode 4.2 and the cathode 2.1.

In a solid oxide fuel cell, SOFC, according to the prior art, the cells C1, C2 . . . and the interconnectors 5 used are the same components, but the operation is the reverse of that of an HTE electrolyzer as has just been explained with a reverse direction of the current, and with air that supplies the cathode compartments and hydrogen as fuel which supplies the anode compartments.

Satisfactory operation of an HTE electrolyzer requires, inter alia, the following essential functions:

A/ good electrical insulation between two adjacent interconnectors in the stack, so as to avoid short-circuiting the individual electrolytic cell inserted between the two interconnectors, B/ good sealing between the two separate compartments, i.e. anode and cathode, so as to avoid recombination of the gases produced leading to a drop in efficiency and above all the appearance of hot spots that damage the electrolyzer, C/ good distribution of the gases both at the inlet and on recovering the gases produced, so as to avoid loss of efficiency, nonuniformity of pressure and temperature within the various individual cells or even unacceptable degradation of the cells, D/ good electrical contact and a sufficient contact area between each cell and interconnector, in order to obtain the lowest ohmic resistance between cells and interconnectors.

The high temperatures considerably complicate the achievement of the aforementioned three essential functions A/ to C/. Moreover, the fragility of the solid oxide cells imposes certain restrictive design rules so as to guarantee their mechanical integrity.

Various designs already exist for simultaneously achieving these three functions A/ to C/. These various designs are influenced by the choice of the type of gas supply and recovery of all of the cells of the electrolyzer.

A first known type of gas supply and recovery consists of a gas supply and recovery from one cell to the next via the outside of the reactor. This first type, generally known as external manifold type, is illustrated schematically in FIG. 3: feed collectors 6 and recovery collectors 6' are arranged around the stack of cells of the reactor R, forming a housing. In this first type of gas supply and recovery, all the electrolytic cells are supplied in an identical manner, which fully satisfies the aforementioned function C/. Moreover, since each electrolytic cell has substantially the same planar dimensions as the interconnectors, this has the advantage of preventing the risks of short-circuits within the electrolyzer. The risks of short-circuits depend more on the nature of the external collectors and on the type of sealing made at the periphery of the stack of cells.

A second known type of gas supply and recovery consists of a gas supply and recovery by distribution of this gas between all the cells within the same reactor. The second type is generally known as internal manifold type.

In this second known type, two different configurations are distinguished as a function of the components of the stack affected or not affected by the actual passage of the gases.

The first configuration is characterized by the fact that the gas supply and recovery columns simultaneously pass through each electrolytic cell and each interconnector. This first configuration is shown schematically in FIG. 4A: a gas supply column 6 (manifold) is seen which passes through all of the components of the stack, namely the cells C1, C2, C3 and the interconnectors 5. Seals 7 are arranged individually around the column 6 level with each electrode (anodes 4.1, 4.2, 4.3 on FIG. 4A) not affected by the supply of the gas ($H_2$ in FIG. 4A), i.e. in the compartment opposite that of the gas supplied. In this first configuration, the cells may have the same dimensions as the interconnectors, which has the advantage of simplifying the electrical insulation between interconnectors. In other words, in this first configuration, the aforementioned function A/is satisfactorily achieved. Similarly, since the fuel or draining gases directly supply each cell within it, the aforementioned function C/ is relatively easy to achieve, even though it is necessary to be sure to have sufficient pressure drops within each anode or cathode compartment so as to guarantee the uniformity of distribution of each cell from the same feed column. The major drawbacks of this first configuration are, on the one hand, having to pierce each cell, which makes it more fragile and, on the other hand, having to produce seals on cell around each gas supply and recovery column 6 in the opposite anode or cathode compartment, especially around the column for recovering $H_2$ level with the anode compartment for recovering $O_2$ and vice versa, which complicates the achievement of the aforementioned function B/.

The second configuration is characterized by the fact that the gas supply and recovery columns only pass through the interconnectors. This second configuration is shown schematically in FIG. 4B: a gas supply column 6 is seen which only passes through the interconnectors 5, the cells C1, C2, C3 not being pierced. Here too, seals 7 are arranged individually around the column 6 level with each electrode (anodes 4.1, 4.2, 4.3 on FIG. 4B) not affected by the supply of the gas ($H_2$ in FIG. 4B), i.e. in the compartment opposite that of the gas supplied. This second configuration therefore has the notable advantage of preserving the integrity of the cells. However it needs to have good electrical insulation between two adjacent interconnectors, at the periphery of the stacked cells, and to achieve good control of the passage of the gases between their distribution columns and the cells.

Various variants are currently known for achieving this second internal manifold configuration without piercing the cells of the stack.

A first variant, which is the commonest, consists first in producing each interconnector of metal alloy according to a geometry in relief with ribs or teeth separated by channels, as already shown in FIG. 2, optionally in the form of a particular structure: the current feed or collection at the electrode is carried out by teeth or ribs which are in direct mechanical contact with the electrode in question and the distribution of the gases and recovery of the gases produced is carried out by the channels. In order to ensure good electrical insulation between adjacent interconnectors, glass seals are deposited between them. This first variant is shown schematically in FIG. 5: the glass seals are produced in order to be deposited between two adjacent interconnectors 5 around each gas distribution column 6. This first variant has several drawbacks that may be listed as follows:

a significant risk of short-circuits in the event of an initially insufficient amount of glass, of flow of the glass leading to direct contact between adjacent interconnectors or in the event of aging of the glass in contact with the metal interconnectors such that the seal gradually loses its electrical insulation properties;

a risk of poor distribution of the gases due to the proximity between the distribution holes in the interconnector defining the gas distribution columns and the surrounding glass: indeed, in the event of poor control of the amount of glass needed, this glass may block the distribution holes;

the difficulty in producing all the seals satisfactorily in the presence of so many reliefs (ribs, channels) on the interconnectors;

a high cost of the interconnectors: indeed, like those shown in FIG. 2, the interconnectors 5 are usually produced by mechanical machining of thick plates or by use of thin metal sheets, typically of 0.1 to 2 mm, embossed and assembled together by laser welding. The material and machining costs are high. Furthermore, the cost of the embossing tool requires mass production in order to be economically profitable.

A second variant consists in coating, with a particular insulating coating, either the reliefs of the interconnectors in the regions around the distribution columns as described in patent application US 2011/0269059, or intermediate parts as described in patent application US 2005/0186463. This second variant is shown schematically in FIG. 6: an electrically insulating coating 71 is directly in contact with each interconnector 5 around the distribution columns 6 and a glass seal 70 is inserted between two adjacent coatings 71. This second variant has the advantage of enabling good electrical insulation and of ensuring the protection of the metal alloy of the interconnectors with respect to the glass needed for the composition of the seals 70. On the other hand, it still has some of the drawbacks already cited for the first variant, namely the high cost of the reliefs of the interconnectors and the risk of poor distribution of the gases due to the risk of blocking of the gas distribution holes by the glass. Moreover, the coating 71 must be produced with a high density in order to be able to be leaktight.

A third variant finally consists in arranging a dense additional part made of electrically insulating material around the gas distribution column. This part bears a glass seal on each of its bearing faces. This third variant is shown schematically in FIG. 7: the part made of electrically insulating material 8 bears, on each of its bearing faces, a glass seal 70. This third variant has the advantage of guaranteeing good electrical insulation between adjacent interconnectors. On the other hand, it still has some of the drawbacks already cited for the first and second variants, namely the high cost of the reliefs of the interconnectors and the risk of poor distribution of the gases due to the risk of blocking of the gas distribution holes by the glass. Furthermore, the introduction of a large number of additional parts within the stack makes the design and assembly of the various components more complex, in particular the control of the chains of dimensions perpendicular to the plane of the cells in order to guarantee good electrical contact between interconnector and cells.

There is therefore a need to find another variant of an internal manifold configuration for supplying and recovering gases within an (HTE) electrolyzer of SOEC type or a fuel cell of SOFC type that makes it possible to achieve the aforementioned functions A/ to C/, in particular while avoiding, at the very least limiting, the drawbacks of the aforementioned three existing variants while retaining their advantages.

One objective of the invention is to at least partly meet this need.

Another objective of the invention is to propose a variant of an internal manifold configuration for supplying and recovering gases within an (HTE) electrolyzer of SOEC type or a fuel cell of SOFC type that makes it possible to reduce the number of parts used and therefore to reduce the cost thereof while simplifying and securing the assembly operations of the various components.

SUMMARY OF THE INVENTION

In order to do this, the invention relates, according to one of its aspects, to a device that forms an electrical insulation and sealing surround for distributing gases in a high-temperature steam electrolyzer of SOEC type or in a fuel cell of SOFC type, the device comprising:

a part made of electrically insulating material extended along two axes of symmetry (X, Y) orthogonal to one another and pierced by a central opening, the peripheral edge of which constitutes a support for an SOEC or SOFC electrochemical cell formed from a cathode, an anode, and an electrolyte inserted between the cathode and the anode, the part also being pierced by four peripheral openings opposite, in pairs, the periphery of its central opening, two of the peripheral openings being extended over a length substantially corresponding to the length of the central opening along one X of the axes and being distributed on either side of said axis X, whilst the two other peripheral openings are extended over a length substantially corresponding to the length of the central opening along the other Y of the axes and being distributed on either side of said axis Y, the part also comprising, on one of its main faces, ribs that define gas distribution channels connecting each of the two peripheral openings extended along the axis X to the central opening, and, on its opposite main face, ribs that define gas distribution channels connecting each of the two peripheral openings extended along the axis Y to the central opening, the part also comprising on each of its main faces at least three recessed continuous regions one of which is at the periphery simultaneously of the central opening, of the ribs and of the two openings connected to the central opening and each of the two others of which is at the periphery of one of the peripheral openings not connected to the central opening;

seals in the form of continuous beads, of which one is deposited on the support for the cell and the others are deposited individually in or along each of the recessed continuous regions.

The term "opening" is understood here and within the context of the invention to mean a through-hole that opens on either side of the part made of electrically insulating material.

In other words, the invention essentially consists of grouping together a portion of the functions of sealing, gas distribution and electrical insulation between interconnectors within one and the same component in the form of a surround made of electrically insulating material, the recessed regions of which serve as support for the actual seals, which facilitates the use thereof and the holding thereof. These recessed regions also serve to compress the constituent electrically insulating material of the surround, such as mica by the constituent material of a seal, such as glass. The electrical insulation and sealing surround according to the invention is thus denser. Finally, these recessed regions may advantageously serve as regions for recovery of the "overflow" of constituent material of a seal, such as glass, when by choice of construction, the latter is placed between two recessed regions.

The electrical insulation and sealing surround thus defined according to the invention makes it possible to guarantee the satisfactory operation of an HTE electrolyzer of SOEC type or of a fuel cell of SOFC type by ensuring the aforementioned functions A/ to C/.

Owing to the insulation and sealing surround according to the invention, the drawbacks of the embodiment variants of the internal manifold configuration according to the prior art are avoided: indeed, any expensive production of the reliefs of the interconnectors which were previously necessary for the distribution of the gases is eliminated, due to the integration thereof into the surround according to the invention and the risk of blockage by the glass of the seals is avoided due to the recessed regions which serve as support for the seals or due to receptacles for the excess from seals that are capable of flowing.

The electrical insulation and sealing surround according to the invention is easy to handle by hand, which facilitates the assembly of the stack of an HTE electrolysis reactor or of a fuel cell. Moreover, due to its support function for seals, advantageously made of glass or glass-ceramic, the surround enables easy handling of the seals previously deposited in the form of beads.

The invention makes it possible to envisage the use of an interconnector consisting of a simple flat metal sheet to which are added, on either side, an element for electrical contact and for distribution of the gases to each cell, and therefore to substantially reduce the cost thereof.

According to one advantageous embodiment, the part made of electrically insulating material is based on mica. In addition to being a very good electrically insulating material, mica may be embossed with great depth. Thus, during embossing, it is possible to compress the initial thickness of the mica by up to 50%. The embossing operation locally densities the mica, which makes it denser and therefore is favorable for the intrinsic sealing thereof.

Preferably, the part made of electrically insulating material is obtained from a strip made of unfired and sintered ceramic.

The reliefs of the part made of electrically insulating material that are formed by the support, the ribs, channels and recessed regions are preferably embossed reliefs.

The seals in continuous bead form are preferably based on glass or glass-ceramic.

The thickness of the part made of electrically insulating material is advantageously between 0.1 and 2 mm.

According to a first variant, at least one continuous bead forming a seal is deposited in a recessed continuous region.

Alternatively, according to a second variant, at least one continuous bead forming a seal is deposited on one of the main faces between two recessed continuous regions.

The depth of the recessed continuous regions of the part made of electrically insulating material in the direction orthogonal to the plane defined by the axes (X, Y) is preferably between 0.05 and 1 mm.

A further subject of the invention is, according to another of its aspects, an electrolysis (HTE) reactor of SOEC type or fuel cell of SOFC type comprising a stack of solid oxide individual electrochemical cells each formed from a cathode, an anode and an electrolyte inserted between the cathode and the anode, a plurality of electrical insulation and sealing surrounds as described above, the support of which supports one of the individual electrochemical cells, a plurality of electrical contact elements each arranged in direct contact with an anode or a cathode of an individual electrochemical cell and a plurality of electrical and fluidic interconnectors each consisting of a single flat metal sheet pierced by four openings, the interconnectors being each arranged in contact with two adjacent electrical insulation surrounds and with their four openings facing the corresponding openings of said adjacent surrounds, and being in contact with two adjacent electrical contact elements, of which one is in electrical contact with the cathode of one of the two individual cells and the other is in electrical contact with the anode or the cathode of the other of the two individual cells.

Each flat metal sheet constituting an interconnector may be made of ferritic steel containing around 20% chromium, preferably made of CROFER® 22APU or FT18TNb, based on nickel, of Inconel® 600 or Haynes® type.

Preferably, each flat metal sheet has a thickness between 0.1 and 1 mm.

According to one embodiment variant, the individual electrolytic cells are of cathode-supported type.

The electrical contact elements may be formed by metal wires or a metal grid or a portion of embossed metal sheet.

The expression "cathode-supported cell" is understood here and within the context of the invention to mean the definition already given in the field of high-temperature electrolysis HTE of water and denoted by the acronym CSC for cathode-supported cell, i.e. a cell in which the electrolyte and the oxygen electrode (anode) are positioned on the thicker hydrogen electrode (cathode) which therefore serves as a support.

DETAILED DESCRIPTION

Figure 3:
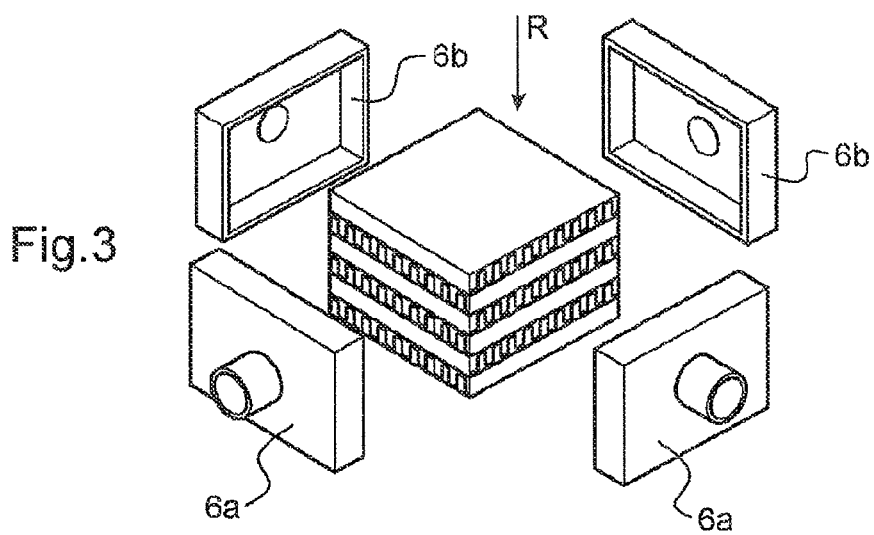
Figure 4A:
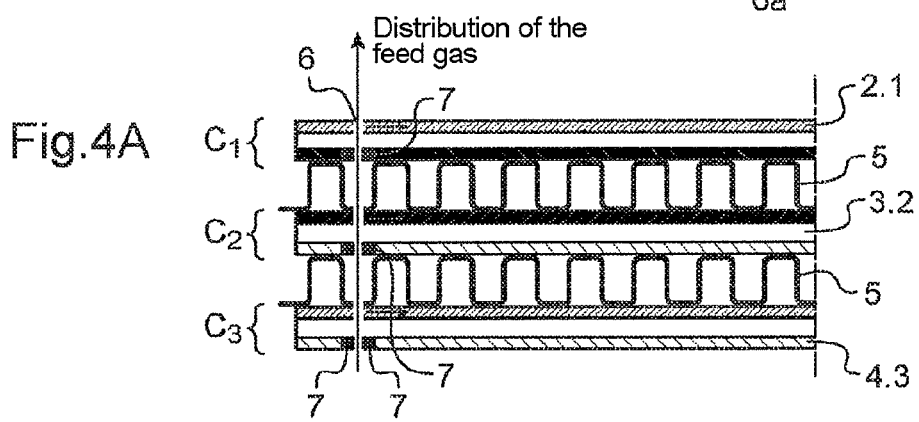
Figure 4B:
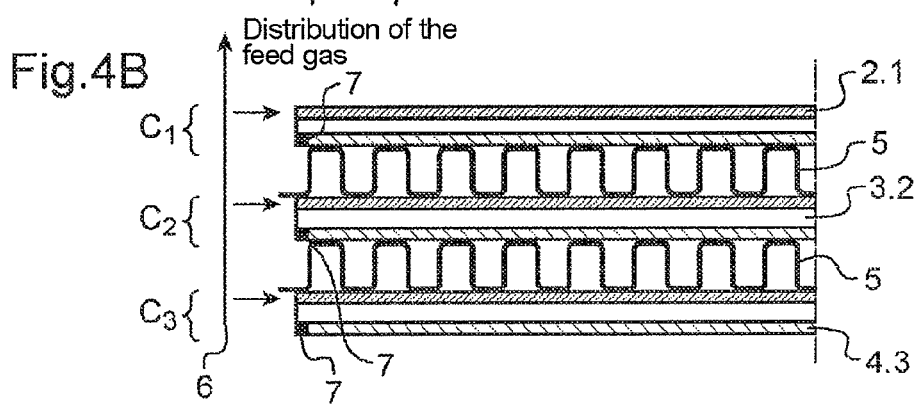
Figure 5:
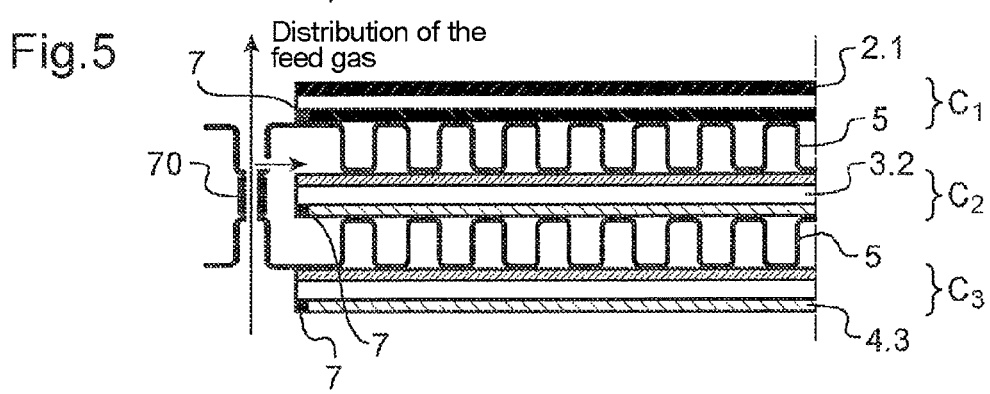
Figure 6:
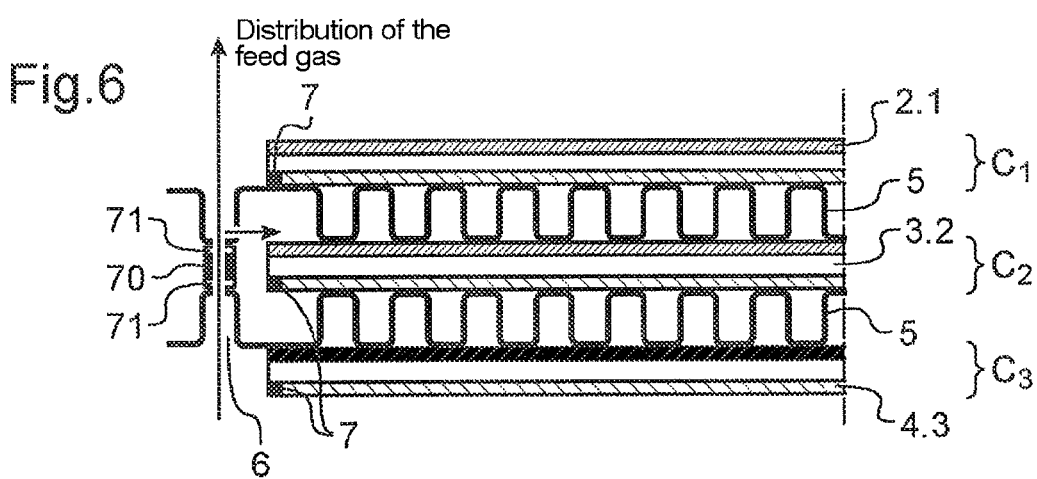
Figure 7:
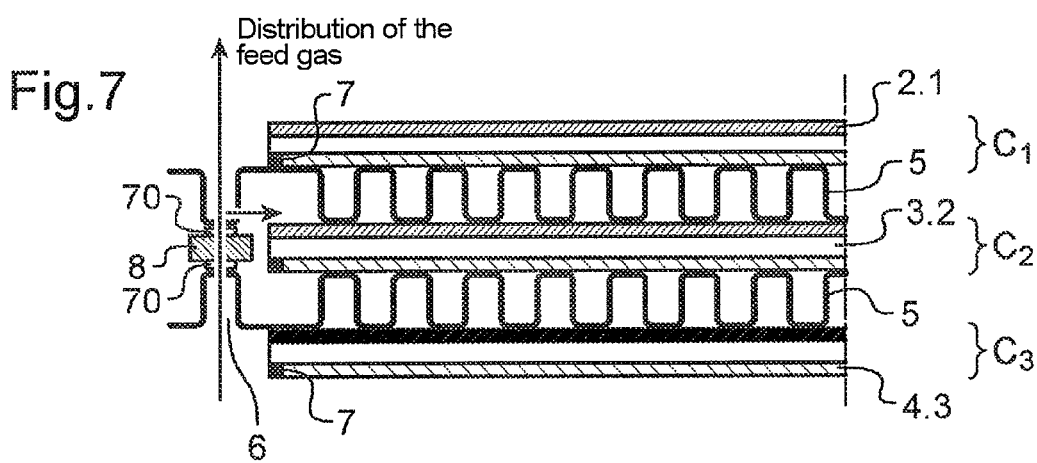
Figure 8:
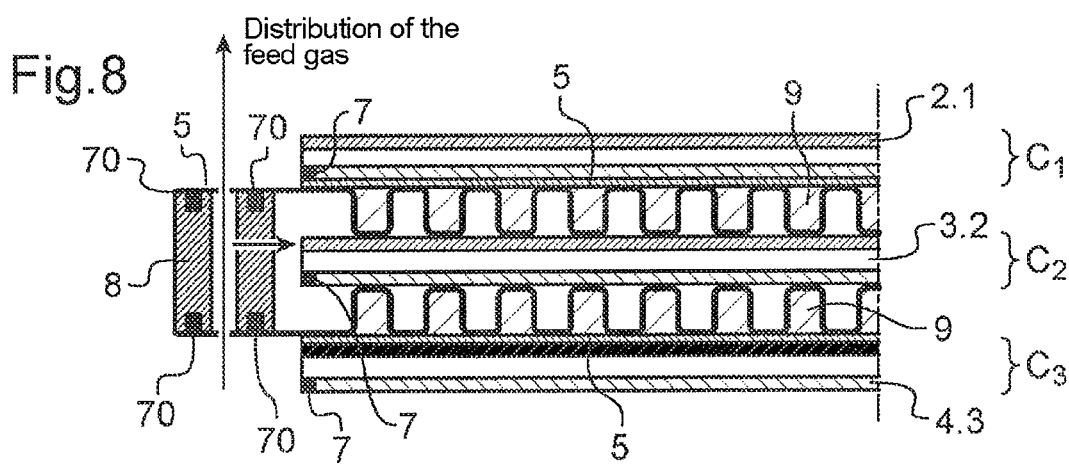

Other advantages and features of the invention will emerge more clearly on reading the detailed description of exemplary embodiments of the invention given by way of illustration and non-limitingly with reference to the following figures, among which:

FIG. 1 is a schematic view showing the operating principle of a high-temperature water electrolyzer;

FIG. 2 is an exploded schematic view of a portion of a high-temperature steam electrolyzer (HTE) of SOEC type comprising interconnectors according to the prior art, FIG. 3 is a partial exploded schematic view of an HTE electrolyzer or of a fuel cell of SOFC type according to the prior art having external manifold type of gas supply and recovery, FIG. 4A is a partial cross-sectional schematic view of an HTE electrolyzer or of a fuel cell of SOFC type according to the prior art having internal manifold type of gas supply and recovery and according to a configuration with piercing of the electrochemical cells, FIG. 4B is a partial cross-sectional schematic view of an HTE electrolyzer or of a fuel cell of SOFC type according to the prior art having internal manifold type of gas supply and recovery and according to a configuration without piercing of the electrochemical cells, FIGS. 5 to 7 are partial cross-sectional views of an HTE electrolyzer or of a fuel cell of SOFC type according to the configuration from FIG. 4B and respectively according to a first, second and third variant, FIG. 8 is a partial cross-sectional schematic view of an HTE electrolyzer or of a fuel cell of SOFC type according to the invention having internal manifold type of gas supply and recovery and according to a configuration without piercing of the electrochemical cells owing to the electrical insulation and sealing surround according to the invention, FIGS. 9A and 9B are exploded views of a portion of an electrolysis reactor according to the invention with an electrical insulation and sealing surround, interconnectors and electrical contact elements according to the invention, respectively seen from the air feed and oxygen $O_2$ recovery side and from the steam $H_2O$ feed and hydrogen $H_2$ recovery side, FIG. 10 is a perspective view of a portion of an electrical insulation and sealing surround according to the invention without the seals, FIG. 11 is a partial cross-sectional view showing a detail of a portion of an electrolysis reactor according to the invention from the steam $H_2O$ feed side, FIG. 12 is a partial cross-sectional view showing a detail of a portion of an electrolysis reactor according to the invention from the air feed side for the recovery of the oxygen $O_2$ produced, FIGS. 13A and 13B are partial cross-sectional views showing the production of seal beads in the electrical insulation and sealing surround respectively according to first and second variants of the invention, FIG. 14 is a partial cross-sectional view showing the arrangement of an element for measuring the electric potential and/or the temperature in a portion of an HTE electrolyzer with an electrical insulation and sealing surround according to the invention.

It is specified here that in all of FIGS. 1 to 12, the symbols and the arrows for supply, on the one hand, of steam $H_2O$, for distribution and recovery of dihydrogen $H_2$ and dioxygen $O_2$, and for the current, for distribution and recovery of oxygen $O_2$, and for the current are shown for the purposes of clarity and accuracy, in order to illustrate the operation of a steam electrolysis reactor according to the prior art and of an electrolysis reactor according to the invention.

It is also specified that all the electrolyzers described are of the type with solid oxides (SOEC, solid oxide electrolyte cell) operating at high temperature. Thus, all the constituents (anode/electrolyte/cathode) of an electrolytic cell are ceramics. The high operating temperature of an electrolyzer (electrolysis reactor) is typically between 600° C. and 1000° C.

Typically, the features of an SOEC individual electrolytic cell suitable for the invention, of cathode-supported (CSC) type, may be those indicated as follows in table 1 below.

TABLE 1

| Electrolytic cell | Unit | Value |
|---|---|---|
| Cathode 2 | | |
| Constituent material | | Ni-YSZ |
| Thickness | µm | 315 |
| Thermal conductivity | W m$^{-1}$ K$^{-1}$ | 13.1 |
| Electrical conductivity | Ω$^{-1}$ m$^{-1}$ | $10^5$ |
| Porosity | | 0.37 |
| Permeability | m$^2$ | $10^{-13}$ |
| Tortuousity | | 4 |
| Current density | A · m$^{-2}$ | 5300 |
| Anode 4 | | |
| Constituent material | | LSM |
| Thickness | µm | 20 |
| Thermal conductivity | W m$^{-1}$ K$^{-1}$ | 9.6 |
| Electrical conductivity | Ω$^{-1}$ m$^{-1}$ | $1 \times 10^4$ |
| Porosity | | 0.37 |
| Permeability | m$^2$ | $10^{-13}$ |

TABLE 1-continued

| Electrolytic cell | Unit | Value |
|---|---|---|
| Tortuousity | | 4 |
| Current density | A · m$^{-2}$ | 2000 |
| Electrolyte 3 | | |
| Constituent material | | YSZ |
| Thickness | µm | |
| Resistivity | Ω m | 0.42 |

All of the FIGS. 1 to 7 have already been commented upon in the preamble. They are not therefore described in detail below.

FIG. 8 shows, in cross-sectional view, a portion of an HTE steam electrolyzer in accordance with the invention. This electrolyzer comprises a device that forms an electrical insulation and sealing surround comprising a part made of electrically insulating material 8 that creates the electrical insulation between two adjacent interconnectors 5 in the stack, the geometry of which allows the distribution of the gases by forming a portion of the distribution column 6 (manifold) and toward the electrodes of the cells C1, C2 . . . in question and which bears the seals 7, 70 necessary for the sealing both around the column 6 and around the electrode opposite the distribution of the feed gas.

The insulation and sealing surround according to the invention enables the use, in the HTE electrolyzer, of interconnectors 5 solely in the form of flat metal sheets, the electrical contact between a flat metal sheet 5 constituting an interconnector and a cathode 2 or an anode 4 of a cell C1, C2 . . . furthermore being created by an added electrical contact element 9.

Thus, as shown schematically in FIG. 8, according to the invention the electrical insulation and sealing surround according to the invention has a structure with all the reliefs necessary simultaneously for the support of a cell C1, C2 . . . , for the distribution of the gases in the distribution column 6 and toward the electrodes of each cell, and for the support of the seals 7, 70.

The surround 7, 70, 8 according to the invention constitutes a mechanical subassembly of an HTE electrolyzer which is easy to handle for the installation thereof in the stack.

Owing to the invention, the high cost of producing an interconnector 5 according to the prior art as shown in FIG. 2 is reduced since it is not necessary to machine or emboss a metal plate in order to structure it with gas distribution channels. Moreover, the risks of blockage of the distribution holes by the glass seals, and therefore of poor distribution of the gases to a cell, are eliminated, which risks are inherent to all the known variants of the internal manifold gas supply configuration.

FIG. 10 shows in perspective the part 8 made of electrically insulating material of an electrical insulation and sealing surround according to the invention for the distribution of gases in a high-temperature steam electrolyzer of SOEC type or in a fuel cell of SOFC type.

This part 8 made of electrically insulating material is extended along two axes of symmetry X, Y that are orthogonal to one another. It is pierced by a central opening 80 and also by four peripheral openings 81, 82, 83, 84 opposite, in pairs, the periphery of its central opening.

The peripheral edge 85 of the central opening 80 constitutes a seating, i.e. a peripheral bearing surface, of an electrochemical cell C1, C2, . . . of SOEC type.

Two 83, 84 of the peripheral openings are extended over a length substantially corresponding to the length of the central opening 80 along the axis X and are distributed on either side of said axis X.

The other two 81, 82 peripheral openings are extended over a length substantially corresponding to the length of the central opening along the axis y and are distributed on either side of said axis Y.

On one of the main faces of the part 8, ribs 86 that define gas distribution channels 87 connect each of the two peripheral openings 83, 84 extended along the axis X to the central opening 80.

On the opposite main face of the part 8, ribs 86 are also made that define gas distribution channels 87 connecting each of the two peripheral openings 81, 82 extended along the axis Y to the central opening.

The part 8 also comprising on each of its main faces at least three recessed continuous regions 88.

As illustrated in FIG. 10, one of these regions 88 is created at the periphery simultaneously of the central opening 80, of the ribs 86 and of the two openings 81, 82 connected to the central opening 80. Each of the two other regions 88 is at the periphery of one of the peripheral openings 83 or 84 not connected to the central opening 80. As shown in the FIG. 11, these recessed regions 88 join up, i.e. have a portion in common.

As shown in FIGS. 9A and 9B, the electrical insulation surround incorporates the sealing function owing to seals in the form of continuous beads. One of the seals 7 is deposited on the support 85 of the cell C1 and the other seals 71, 72, 73, 74 are deposited individually in each of the recessed continuous regions 88. As a variant, the other seals 71, 72, 73, 74 may be deposited individually between two of the recessed continuous regions 88: the recessed regions 88 then acting as regions for recovery of "overflow" of the constituent material of the seals. The seals 7, 71, 72, 73, 74 in continuous bead form are preferably based on glass or on glass-ceramic used in the form of slip.

The part 8 made of electrically insulating material according to the invention therefore has an assembly of relief shapes, namely the ribs 86 that define the gas distribution channels 87, the support 85 of an electrolytic cell C1, the recessed regions 88 suitable for bearing seals, which make it possible to carry out all the functions of the surround, namely, besides the electrical insulation intrinsic to the electrically insulating material of the part 8, respectively the distribution of the gases, the cell support, the sealing around the gas distribution columns 6 and the cells.

Depending on the nature of the electrically insulating material chosen, the techniques to be used for producing these relief shapes may vary and the cost range for manufacturing the part 8 according to the invention may also vary.

The inventors believe that machining a ceramic in order to produce this part 8 involves an unacceptable production cost within the context of an HTE electrolyzer or an SOFC fuel cell, with a feasibility not mastered to date regarding certain very thin portions, typically of the order of around a hundred microns remaining on a 1 mm thick part.

The inventors believe that it is thus preferable to produce all of the relief shapes by embossing. The embossing is thus preferably carried out either within an unfired ceramic strip that is to be sintered once shaped, or within a deformable insulator of the type based on mica. This embossing technique advantageously makes it possible to densify the mica in the regions compressed for the creation of the recessed regions, the glass or the glass-ceramic for producing the seals then being deposited on the part 8 without risk of infiltrating it. In addition, this embossing technique, without removal of chippings, makes it possible to avoid any loss of material and is particularly advantageous for mass production with a large number of parts. Furthermore, due to the fact that, according to the invention, the tolerances for manufacture by embossing of the part 8 made of insulating material according to the invention are much lower than those required during the embossing of interconnectors according to the prior art in order to form their reliefs, especially the relief intended for electrical contact and for that of the sealing. Typically, manufacturing tolerances of 0.05 to 0.1 mm are envisaged for parts 8 made of insulating material according to the invention instead of the tolerances of 0.01 mm required for the manufacture of the interconnectors according to the prior art by embossing.

Thus, it is ultimately possible to envisage a process for producing a surround according to the invention with all its functions that is not very expensive: indeed, the electrical insulation is intrinsic to the nature of the insulating material of the part 8, advantageously based on mica, the sealing is produced by depositing, simply, in the recessed regions 8 or beside these recessed regions, continuous beads of glass or of glass-ceramic that are inexpensive and already tried and tested, and finally the distribution of the gases is ensured by forming the channels by embossing of the part 8 with lower, and therefore less expensive, tolerances.

FIGS. 11 and 12 show, in cross-sectional view, the supply via the distribution channel (manifold) and the distribution of the gases on the side respectively of a cathode compartment ($H_2O/H_2$) of an electrolytic cell C1 and of an anode compartment (air/$O_2$) through an electrical insulation and sealing surround according to the invention.

Distinguished in particular in these FIGS. 11 and 12 is the relative arrangement between interconnectors 5 in the form of flat metal sheets, electrical insulation and sealing surround with the part 8, an electrolytic cell C1 and the electrical contact elements 9.

The seals envisaged for each of the anode and cathode compartments are also clearly distinguished. The seal 7 under the cell C1 separates the cathode compartment, i.e. the compartment for production of $H_2$, from the anode compartment, i.e. the compartment for recovery of the $O_2$ produced. The peripheral seal 71 around the manifold 81 for supplying steam $H_2O$ seals the cathode compartment. The peripheral seal 74 around the manifold 81 prevents the $H_2O/H_2$ from passing into an anode compartment. The peripheral seal 73 seals the anode compartment. The peripheral seal 72 around the manifold 83 for supplying air as draining gas prevents it from passing into a cathode compartment.

With reference to these FIGS. 11 and 12, the process will now be described for operating an electrolysis reactor with an electrical insulation surround according to the invention as has just been described.

It is firstly specified that all of the electrolytic cells C1 to C3 of the stack of the HTE electrolyzer are passed through by the same electric current which powers them in series. The current passes through a flat metal sheet 5 constituting an interconnector then through an electrical contact element 9 and through each cell C1 to C3 and exits through the opposite electrical contact element 9 and through the opposite flat metal sheet 5.

The operating process of the HTE electrolysis reactor is carried out as follows:

the openings 81 of the surrounds 8 are supplied with steam $H_2O$ which reaches as far as the cathodes 2.1, 2.2, 2.3 of the cells C1 to C3 by passing in the supply channels 87 in fluid communication with each opening 81 (FIG. 11), the openings 83 are simultaneously supplied, in crosscurrent, with air as draining gas which reaches as far as the anodes 4.1, 4.2, 4.3 of the cells C1 to C3 by passing in the supply channels 86 in fluid communication with each opening 83 on the face opposite the one bearing the steam supply channels 86 (FIG. 12), recovered, in the openings 82, is the hydrogen produced by steam electrolysis which originates from the recovery channels 87 in fluid communication with the latter openings, and simultaneously recovered, in the openings 84, is the oxygen with its draining gas produced by steam electrolysis which originates from the recovery channels 87 in fluid communication with the latter openings.

FIGS. 13A and 13B each show a possible embodiment variant of the seals in the form of continuous beads based on glass or on glass-ceramic used in the form of slip. According to the invention, it is possible to prepare all the seals before the assembly operation by actual stacking of all the components of the HTE electrolyzer. The continuous beads 7, 70, 71, 72, 73, 74 may thus be deposited in or along recessed continuous regions 88 before the production of the stack. This has the advantage that it is possible to easily handle a single physical element, namely the surround consisting of the part 8 with its deposited seals 7, 70, 71, 72, 73, 74. Thus, the handling operations that are difficult to carry out according to the prior art, of seals in the form of unsupported beads, i.e. beads lacking consistency, are avoided.

According to the variant illustrated in FIG. 13A, a continuous bead 70 made of glass or glass-ceramic is lodged in a recessed region 88 of the insulating part 8 which then constitutes a lateral block for keeping the glass in its compartment.

According to the variant illustrated in FIG. 13B, a continuous bead 70 made of glass or glass-ceramic is lodged between two recessed continuous regions 88.1, 88.2 of the insulating part 8, one and/or the other of these recessed continuous regions 88.1, 88.2 then constituting a compartment for overflow of glass or glass-ceramic if the initial amount used for producing the bead 70 was too large. Furthermore, these recessed regions are advantageously produced by an embossing operation which locally densifies the constituent material of the support such as mica, which makes it denser and therefore is favorable for the intrinsic sealing thereof. During embossing, it is possible to compress the initial thickness of the mica by up to 50%. This variant is particularly advantageous since the right amount of glass or glass-ceramic needed for achieving its sealing function is sometimes difficult to estimate within the context of an HTE electrolyzer or an SOFC fuel cell and yet is essential for the correct operation thereof. Furthermore, the constituent material of the support such as mica has a tendency to absorb the constituent material of the seal such as glass. It is therefore important to control the width of the region supporting the glass so as to control the amount of glass to be deposited both for saturating the mica and for filling the space necessary for the sealing. This variant enables such a control since the width is fixed by the distance between two adjacent recessed regions.

FIG. 14 illustrates the possibility of placing an instrumentation element 10 for measuring the voltage and/or temperature in thin regions and in the corners of the part 8 made of insulating material, without risk of short-circuiting or of excessive thickness, due to the production of this part 8 by embossing.

As already indicated, owing to the structure of the electrical insulation surround according to the invention, an interconnector 5 according to the invention may advantageously consist of a single thin flat metal sheet, pierced with openings corresponding to the four openings of the part 8 of the surround. Preferably, a thin metal sheet is a sheet having a thickness of less than 1 mm, typically of the order of 0.2 mm. All the sheets are advantageously made of ferritic steel containing around 20% chromium, preferably made of CROFER® 22APU or FT18TNb, based on nickel, of Inconel® 600 or Haynes® type in thicknesses typically between 0.1 and 1 mm.

The invention is not limited to the examples which have just been described; in particular, features of the examples illustrated may be combined with one another in variants that are not illustrated.

Thus, although in the examples illustrated the seals 71 and 73 respectively around the cathode and anode compartments have a glass or glass-ceramic continuous bead portion which is common with the seals 72 and 74 respectively of the gas distribution openings 83, 84 and 81, 82, it is just as possible to provide separate continuous beads, i.e. for example on the same main face of the surround 8, a continuous bead 71 around a cathode compartment and a continuous bead 72, separate from the bead 71, around an opening 83.

The invention claimed is:

1. A device that forms an electrical insulation and sealing surround for distributing gases in a high-temperature steam electrolyzer of SOEC type or in a fuel cell of SOFC type, the device comprising:

a part made of electrically insulating material extended along two axes of symmetry (X, Y) orthogonal to one another and pierced by a central opening, the peripheral edge of which constitutes a support for an SOEC or SOFC electrochemical cell (C1, C2, . . . ) formed from a cathode, an anode, and an electrolyte inserted between the cathode and the anode, the part also being pierced by four peripheral openings opposite, in pairs, the periphery of its central opening, two of the peripheral openings being extended over a length substantially corresponding to the length of the central opening along one X of the axes and being distributed on either side of said axis X, whilst the two other peripheral openings are extended over a length substantially corresponding to the length of the central opening along the other Y of the axes and being distributed on either side of said axis Y, the part also comprising, on one of its main faces, ribs that define gas distribution channels connecting each of the two peripheral openings extended along the axis X to the central opening, and, on its opposite main face, ribs that define gas distribution channels connecting each of the two peripheral openings extended along the axis Y to the central opening, the part also comprising on each of its main faces at least three recessed continuous regions one of which is at the periphery simultaneously of the central opening, of the ribs and of the two openings connected to the central opening and each of the two others of which is at the periphery of one of the peripheral openings not connected to the central opening;

seals in the form of continuous beads, of which one is deposited on the support for the cell and the others are deposited individually in or along each of the recessed continuous regions.

2. The electrical insulation and sealing surround as claimed in claim 1, wherein the part made of electrically insulating material is based on mica.

3. The electrical insulation and sealing surround as claimed in claim 1, wherein the part made of electrically insulating material is obtained from a strip made of unfired and sintered ceramic.

4. The electrical insulation and sealing surround as claimed in claim 1, wherein the reliefs of the part made of electrically insulating material that are formed by the support, the ribs, channels and recessed regions are embossed reliefs.

5. The electrical insulation and sealing surround as claimed in claim 1, wherein the seals in continuous bead form are based on glass or glass-ceramic.

6. The electrical insulation and sealing surround as claimed in claim 1, wherein the thickness of the part made of electrically insulating material is between 0.1 and 2 mm.

7. The electrical insulation and sealing surround as claimed in claim 1, wherein at least one continuous bead forming a seal is deposited in a recessed continuous region.

8. The electrical insulation and sealing surround as claimed in claim 1, wherein at least one continuous bead forming a seal is deposited on one of the main faces between two recessed continuous regions.

9. The electrical insulation and sealing surround as claimed in claim 1, wherein the depth of the recessed continuous regions of the part made of electrically insulating material in the direction orthogonal to the plane defined by the axes (X, Y) is between 0.05 and 1 mm.

10. An electrolysis (HTE) reactor of SOEC type or fuel cell of SOFC type comprising a stack of solid oxide individual electrochemical cells (C1, C2, C3) each formed from a cathode, an anode and an electrolyte inserted between the cathode and the anode, a plurality of electrical insulation and sealing surrounds as claimed in claim 1, the support of which supports one of the individual electrochemical cells, a plurality of electrical contact elements each arranged in direct contact with an anode or a cathode of an individual electrochemical cell and a plurality of electrical and fluidic interconnectors each consisting of a single flat metal sheet pierced by four openings, the interconnectors being each arranged in contact with two adjacent electrical insulation surrounds and with their four openings facing the corresponding openings of said adjacent surrounds, and being incontact with two adjacent electrical contact elements, of which one is in electrical contact with the cathode of one of the two individual cells (C1) and the other is in electrical contact with the anode or the cathode of the other of the two individual cells.

11. The electrolysis reactor of SOEC type or fuel cell of SOFC type as claimed in claim 10, wherein each flat metal sheet constituting an interconnector is made of ferritic steel containing around 20% chromium.

12. The electrolysis reactor of SOEC type or fuel cell of SOFC type as claimed in claim 10, wherein each sheet has a thickness between 0.1 and 1 mm.

13. The electrolysis reactor of SOEC type or fuel cell of SOFC type as claimed in claim 10, wherein the individual electrolytic cells are of cathode-supported type.

14. The electrolysis reactor of SOEC type or fuel cell of SOFC type as claimed in claim 10, wherein the electrical contact elements are formed by metal wires or a metal grid or a portion of embossed metal sheet.

* * * * *